UNITED STATES PATENT OFFICE.

JOSEPH W. SMITH, OF GIRARD, OHIO, ASSIGNOR OF ONE-THIRD TO CARRIE H. NEW, OF YOUNGSTOWN, OHIO.

COMPOSITION FOR TAWING LEATHER.

SPECIFICATION forming part of Letters Patent No. 632,208, dated August 29, 1899.

Application filed June 16, 1898. Serial No. 683,570. (No specimens.)

*To all whom it may concern:*

Be it known that I, JOSEPH W. SMITH, a citizen of the United States, residing at Girard, in the county of Trumbull and State of Ohio, have invented certain new and useful Improvements in Compositions of Matter for Tawing Leather, of which the following is a specification.

My invention relates to the tanning or tawing of leather and is substantially what is known in the tanners' art as a "tanning liquor or compound." The class of compounds for this purpose to which my invention belongs is that in which chromic oxid is formed in the fabric of the hide to be treated, forming what is commonly known as "chrome leather."

I will first disclose the substances entering into my composition or compound and then define the matter for which I claim protection by specific claim.

The substances entering into the composition and their approximate quantities are as follows, to wit: chrome alum in the crystallized form, one hundred and fifty pounds; carbonate of soda, seventy-five pounds; hydrated chromic acid, an aqueous solution of chromic trioxid of the strength of twelve per cent., twelve pounds; hydrochloric acid, used at a specific gravity of 1.146 and of the strength of 28.61, six gallons; sodium chlorid, ten pounds, and water fifty gallons.

In the preparation of my compound I take, first, water, twenty-five gallons; chrome alum, one hundred and fifty pounds; carbonate of soda, fifty pounds. Then I take water, twenty-five gallons; hydrochloric acid, six gallons; hydrated chromic acid, twelve pounds; sodium carbonate, twenty-five pounds; sodium chlorid, ten pounds. The two preparations are then intermixed, forming a tawing compound after the terms of my invention.

It is entirely unnecessary to describe the application of the liquor to the hides and the further processes of tanning, as the use of prepared tanning or tawing liquors is well known in tanneries.

Having thus clearly disclosed the terms of my invention, what I desire to secure by Letters Patent and to claim is—

A composition of matter for tawing, comprising chrome alum, carbonate of soda, hydrated chromic acid, hydrochloric acid, sodium chlorid, and water in the proportions duly specified.

In testimony whereof I affix my signature in the presence of two witnesses.

JOSEPH W. SMITH.

Witnesses:
   E. C. WEAVER,
   W. D. STEWART.